(12) United States Patent
Ikechi

(10) Patent No.: US 10,507,772 B2
(45) Date of Patent: Dec. 17, 2019

(54) VEHICULAR DOOR TRIM

(71) Applicant: KASAI KOGYO CO., LTD., Kanagawa (JP)

(72) Inventor: Shoichi Ikechi, Samukawa-machi (JP)

(73) Assignee: KASAI KOGYO CO., LTD., Koza-Gun, Kanagawa (JP)

( * ) Notice: Subject to any disclaimer, the term of this patent is extended or adjusted under 35 U.S.C. 154(b) by 64 days.

(21) Appl. No.: 16/065,506

(22) PCT Filed: Jun. 30, 2016

(86) PCT No.: PCT/JP2016/003130
§ 371 (c)(1),
(2) Date: Jun. 22, 2018

(87) PCT Pub. No.: WO2018/002965
PCT Pub. Date: Jan. 4, 2018

(65) Prior Publication Data
US 2019/0001903 A1    Jan. 3, 2019

(51) Int. Cl.
*B60R 13/02* (2006.01)
*B60N 2/75* (2018.01)
*B60J 5/04* (2006.01)

(52) U.S. Cl.
CPC .......... *B60R 13/0243* (2013.01); *B60R 13/02* (2013.01); *B60R 13/0206* (2013.01); *B60J 5/0413* (2013.01); *B60J 5/0437* (2013.01); *B60N 2/78* (2018.02)

(58) Field of Classification Search
CPC . B60R 12/0243; B60R 13/02; B60R 13/0206; B60N 2/78; B60J 5/0413; B60J 5/0437
See application file for complete search history.

(56) References Cited

U.S. PATENT DOCUMENTS

2006/0152037 A1    7/2006  Dry et al.
2009/0134659 A1*   5/2009  Hall ..................... B60J 5/0434
                                                    296/146.7

FOREIGN PATENT DOCUMENTS

| GB | 2422137 A | 7/2006 |
| JP | S58-054917 U | 4/1983 |
| JP | H09-099768 A | 4/1997 |
| JP | 2002-114035 A | 4/2002 |
| JP | 2006-327536 A | 12/2006 |

OTHER PUBLICATIONS

International Search Report for International Application No. PCT/JP2016/003130 dated Sep. 13, 2016, Japan.

* cited by examiner

*Primary Examiner* — Lori L Lyjak
(74) *Attorney, Agent, or Firm* — United IP Counselors, LLC

(57) ABSTRACT

A vehicular door trim having excellent unity with a door armrest is provided. An armrest lower section includes a bulging portion bulging toward a cabin side, a shelf portion arranged continuously from the bulging portion and on which an armrest upper section is placed, and a bracket portion extending upward from a side edge of the shelf portion to a back face side of a center trim. The bracket portion includes a first fixing part to which the armrest upper section is fixed and a second fixing part to which the center trim is fixed.

4 Claims, 3 Drawing Sheets

VEHICULAR DOOR TRIM

CROSS-REFERENCE TO RELATED APPLICATIONS

This application is a National Stage Entry application of PCT International Application No. PCT/JP2016/003130 filed on Jun. 30, 2016, the entire contents of which are hereby incorporated by reference.

BACKGROUND

1. Technical Field

The present invention relates to a vehicular door trim.

2. Description of the Background

Conventionally, there has been known a vehicular door trim attached to a vehicle body panel on a cabin side. A door armrest for a seated occupant having an appropriate length in a vehicle front-rear direction is arranged at the vehicular door trim at a height to provide easy resting of an elbow of the occupant. An armrest lower section bulging toward the cabin side is arranged at a door trim main body and an armrest upper section is arranged on an upper part of the armrest lower section. An armrest upper section is fixed by fastening, with a screw, an armrest fixing piece formed at the armrest upper section to a bracket portion extended from a side edge of the armrest lower section.

A side edge of the armrest upper section defining a boundary to the door trim (hereinafter, called an outer edge with respect to an inner-outer direction of a cabin) is shaped in accordance with a formative surface of the door trim. The outer edge of the armrest upper section is in intimate contact with the surface of the door trim. A switch panel provided with various kinds of switches such as a power-window switch, a pull-handle, and the like are arranged at the armrest upper section (e.g., Japanese Patent Application Laid-open No. 2006-327536 (hereinafter referred to as "Patent Literature 1").

BRIEF SUMMARY

According to the conventional armrest structure described above, when a load is applied by an occupant to the armrest upper section, the armrest may be deformed, which causes poor unity with the door trim main body. For example, when the armrest upper section is pulled toward a cabin side with one's hand placed thereon, a gap may occur between the outer edge of the armrest upper section and the door trim. Further, when a load is applied to the armrest upper section from the upper side, the armrest may be depressed downward.

In view of the above, an object of the preset invention is to provide a vehicular door trim having excellent unity with a door armrest.

To achieve the abovementioned object, according to an aspect of the present invention is a vehicular door trim attached to a vehicle body panel on a cabin side. The vehicular door trim includes a trim main body including a first trim and a second trim attached below the first trim; an armrest lower section integrally formed with an upper part of the second trim; and an armrest upper section located on the armrest lower section. The armrest lower section includes a bulging portion bulging toward the cabin side, a shelf portion arranged continuously from the bulging portion and on which the armrest upper section is placed, and a bracket portion extending upward from a side edge of the shelf portion to a back face side of the first trim. The bracket portion includes a first fixing part to which the armrest upper section is fixed, and a second fixing part to which the first trim is fixed.

In the above, the vehicular door trim may further include a switch panel attached to an opening portion formed at an upper face of the armrest upper section. The switch panel may be fixed to the first fixing part.

In the above, the first trim may include a base arranged via a plurality of legs rising on a back face side at a lower end part of the first trim, and the first trim may be fixed to the second fixing part via the base.

According to another aspect of the present invention is a vehicular door trim attached to a vehicle body panel on a cabin side. The vehicular door trim includes a trim main body including a first trim and a second trim attached below the first trim; an armrest lower section integrally formed with an upper part of the second trim; an armrest upper section located on the armrest lower section; and a switch panel attached to an opening portion formed at an upper face of the armrest upper section. The armrest lower section includes a bulging portion bulging toward the cabin side, a shelf portion arranged continuously from the bulging portion and on which the armrest upper section is placed, and a bracket portion extending upward from a side edge of the shelf portion to a back face side of the first trim. The bracket portion includes a first fixing part to which the switch panel is fixed, and a second fixing part to which the first trim is fixed.

According to the present invention, a vehicular door trim having excellent unity with a door armrest is provided.

DETAILED DESCRIPTION

Figure 1:
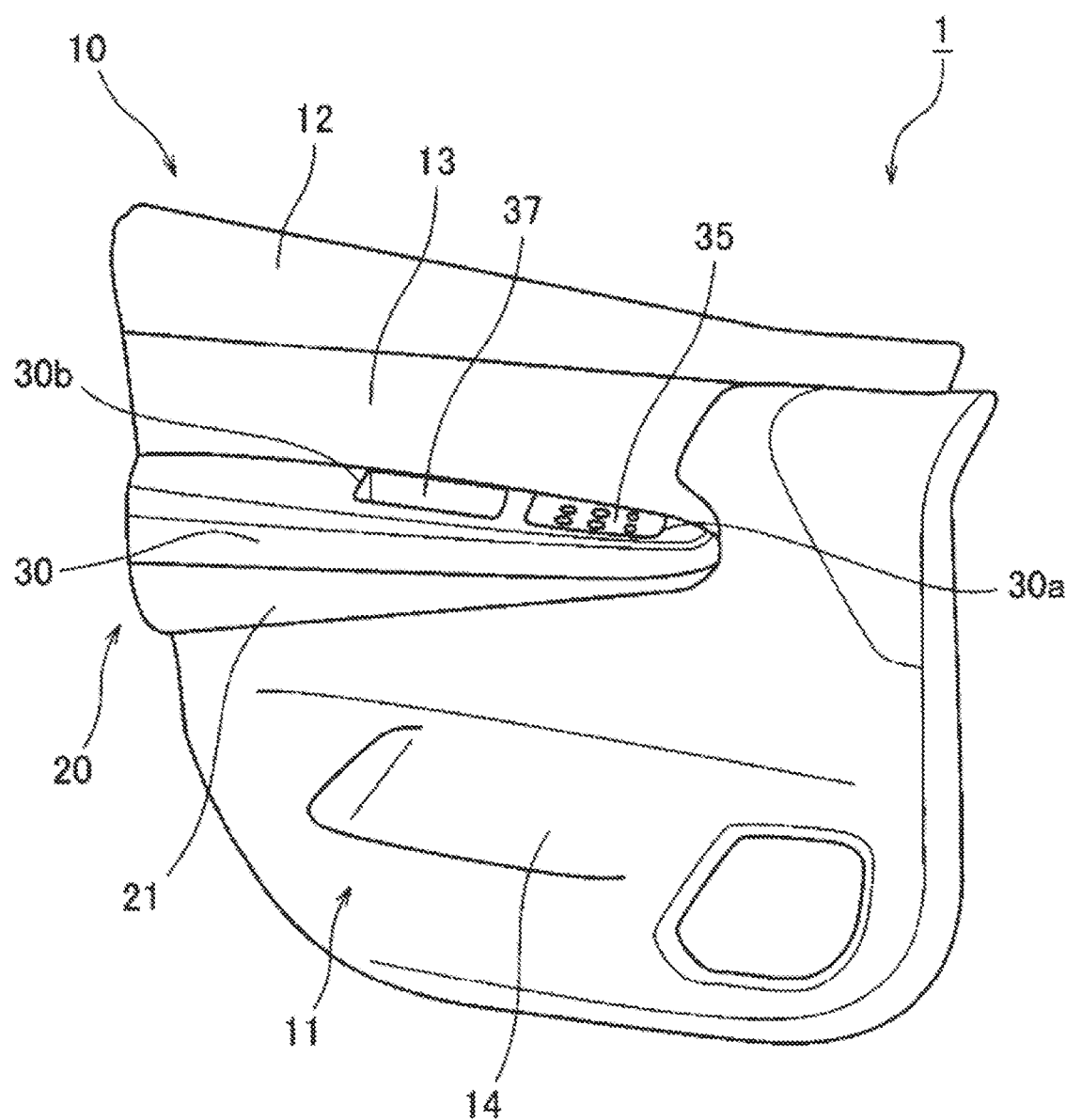
FIG. 1 is a perspective view schematically illustrating a side door to which a door trim of an embodiment is applied.
Figure 2:
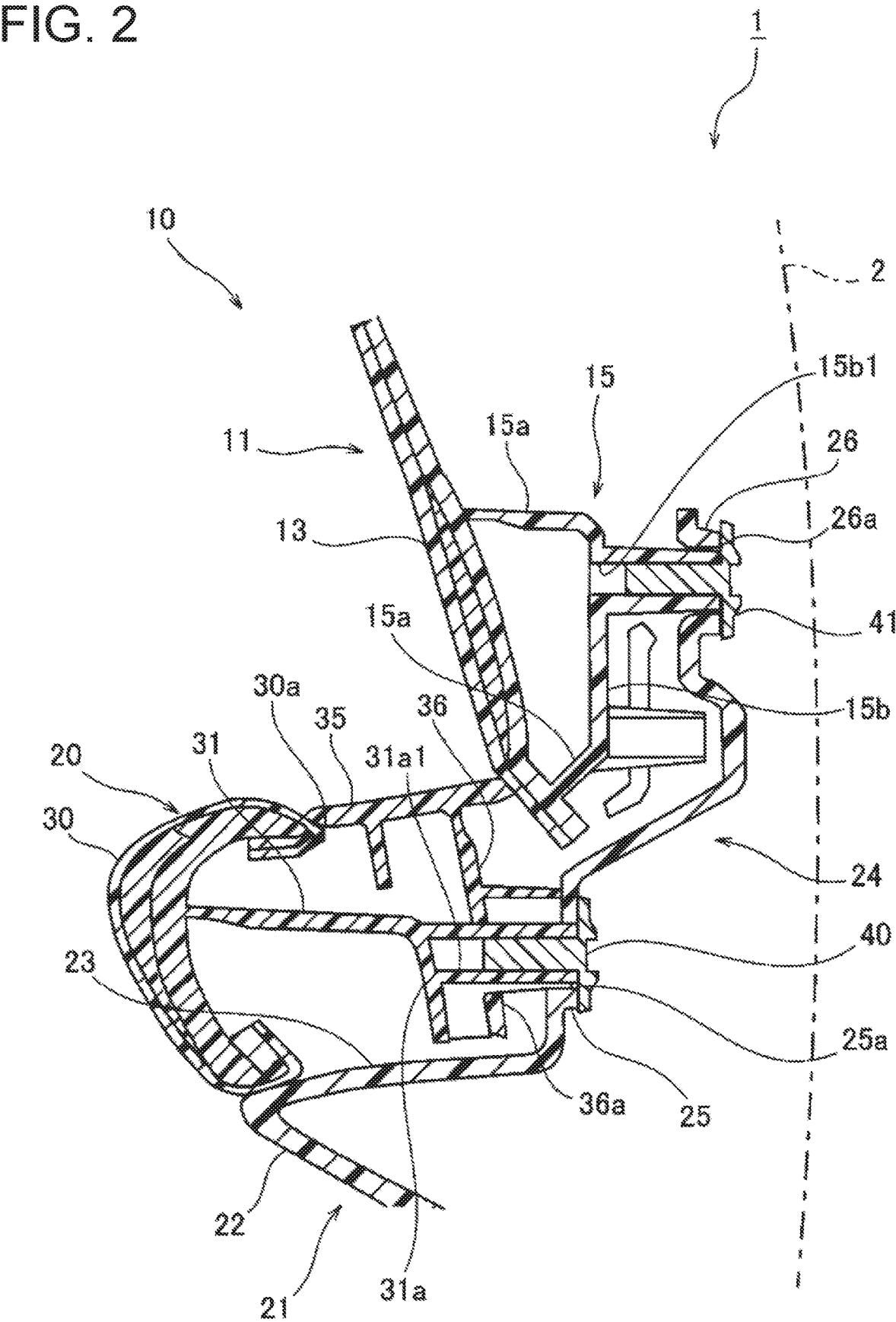
FIG. 2 is a sectional view of the door trim illustrated in FIG. 1.

FIG. 1 is a perspective view schematically illustrating a side door 1 to which a door trim 10 of an embodiment is applied. FIG. 2 is a sectional view of the door trim 10 illustrated in FIG. 1.

The side door 1 of a vehicle includes a door outer panel (not illustrated), which is a vehicle body panel, and a door inner panel 2. The door trim 10, which is a vehicle interior member, is attached to a panel face of the door inner panel 2 on the side of a cabin.

A trim main body 11 serving as a main part of the door trim 10 is structured with multiple trims. In the present embodiment, the trim main body 11 includes an upper trim 12, a center trim 13, and a lower trim 14 arranged in three layers as corresponding respectively to an upper section, a center section, and a lower section of the side door 1 on the cabin side. The trims 12, 13, 14 are formed of appropriate synthetic resin with molding. A surface member is stuck to a face of each trim 12, 13, 14 on the cabin side for cushioning and better looking. The trims 12, 13, 14 are fixed to one another, so that the trim main body 11 is formed as a single structural body.

A door armrest 20 that bulges toward the cabin side with an appropriate length in a vehicle front-rear direction is arranged at the door trim 10 at a height to provide easy resting of an elbow of a seated occupant. The occupant can have a relaxed seating posture by putting his/her elbow on the door armrest 20.

In the present embodiment, the door armrest 20 is arranged at a connecting part of the center trim 13 and the lower trim 14. The door armrest 20 includes an armrest lower section 21 and an armrest upper section 30.

The armrest lower section 21 is formed at an upper part of the lower trim 14 in an integral manner. The armrest lower section 21 includes a bulging portion 22, a shelf portion 23, and a bracket portion 24.

The bulging portion 22 bulges toward the cabin side with a part of an upper part of the lower trim 14 swelling toward the cabin side.

The shelf portion 23 is formed continuously from an upper end of the bulging portion 22 and forms an upper face of the lower trim 14. The armrest upper section 30 is located on the shelf portion 23. Not necessarily required to be arranged continuously in the vehicle front-rear direction, the shelf portion 23 may be arranged intermittently at appropriate intervals.

The bracket portion 24 is arranged continuously from a side edge of the shelf portion 23 on the outer side. The bracket portion 24 extends upward from the side edge of the shelf portion 23 to a back face side of the center trim 13 above the lower trim 14. Details of the bracket portion 24 will be described later.

The armrest upper section 30 is located on the shelf portion 23 of the armrest lower section 21 to form the door armrest 20 along with the armrest lower section 21. The armrest upper section 30 is in a box shape with a bottom face facing the armrest lower section 21 (the shelf portion 23) and a side face facing the center trim 13 opened respectively. A surface member is stuck to a face of the armrest upper section 30 for cushioning and better looking.

A panel opening 30a is formed on an upper face of the armrest upper section 30 at a position deviated to be adjacent to the center trim 13. A switch panel 35 is arranged at the panel opening 30a. A side edge of the switch panel 35 along the vehicle front-rear direction is in contact with the center trim 13 defining a boundary to the center trim 13. Switches for a window operation and other operations are arranged at the switch panel 35.

A handle opening 30b is formed behind the panel opening 30a. A resin-made pull-handle 37 having a rectangular cup shape is fitted to the handle opening 30b.

In the following, the bracket portion 24 of the armrest lower section 21 will be described. The bracket portion 24 extends upward from the side edge of the shelf portion 23 to the back face side of the center trim 13. The bracket portion 24 is plate-shaped and improved in stiffness by being bent at appropriate positions. The bracket portion 24 includes a first fixing part 25 and a second fixing part 26.

The first fixing part 25 is arranged on a lower end side of the bracket portion 24, that is, on a side of a connecting part with the shelf portion 23. The armrest upper section 30 is fixed to the first fixing part 25 using a screw 40.

Specifically, an armrest fixing piece 31 extending along a vehicle width direction to the first fixing part 25 is integrally arranged at an inner face of the armrest upper section 30. A fastening part 31a fastened with the first fixing part 25 is arranged at a distal end of the armrest fixing piece 31. A screw hole 31a1 is formed at the fastening part 31a. A through hole 25a is formed at the first fixing part 25 at a position corresponding to the fastening part 31a of the armrest fixing piece 31. The screw 40 is screwed to the screw hole 31a1 of the fastening part 31a after being inserted to the through hole 25a from the outer side. Thus, the armrest fixing piece 31 is fixed to the first fixing part 25, so that the armrest upper section 30 is fixed to the first fixing part 25 via the armrest fixing piece 31.

Further, the switch panel 35 is fixed to the first fixing part 25 along with the armrest upper section 30 using the screw 40.

Specifically, a panel fixing piece 36 extending along a vehicle height direction to the first fixing part 25 is integrally arranged at a back face of the switch panel 35. A distal end 36a of the panel fixing piece 36 is sandwiched between the fastening part 31a of the armrest fixing piece 31 and the first fixing part 25, and fastened along with the armrest fixing piece 31. Thus, the panel fixing piece 36 is fixed to the first fixing part 25, so that the switch panel 35 is fixed to the first fixing part 25 via the panel fixing piece 36.

The second fixing part 26 is arranged on an upper end side of the bracket portion 24. A lower part of the center trim 13 is fixed to the second fixing part 26 using a screw 41.

Specifically, a trim fastening portion 15 fastened with the second fixing part 26 is arranged on the back face side at the lower part of the center trim 13. The trim fastening portion 15 includes a plurality of legs 15a rising on the back face side of the center trim 13, and a base 15b continuously arranged from the legs 15a. A screw hole 15b is formed at the base 15b. A through hole 26a is formed at the second fixing pan 26 at a position corresponding to the base 15b of the center trim 13. The screw 41 is screwed to the screw hole 15b1 of the base 15b after being inserted to the through hole 26a from the outer side. Thus, the trim fastening portion 15 is fixed to the second fixing part 26, so that the center trim 13 is fixed to the second fixing part 26 via the trim fastening portion 15.

As described above, according to the door trim 10 of the present embodiment, the armrest lower section 21 includes the bracket portion 24. The armrest upper section 30 and the switch panel 35 are fixed to the first fixing part 25 of the bracket portion 24. The center trim 13 is fixed to the second fixing part 26 of the bracket portion 24. Accordingly, the armrest upper section 30 and the switch panel 35 are fixed to the armrest lower section 21 via the lower end part of the bracket portion 24, and the center trim 13 is fixed to the armrest lower section 21 via the upper end part of the bracket portion 24.

Figure 3:
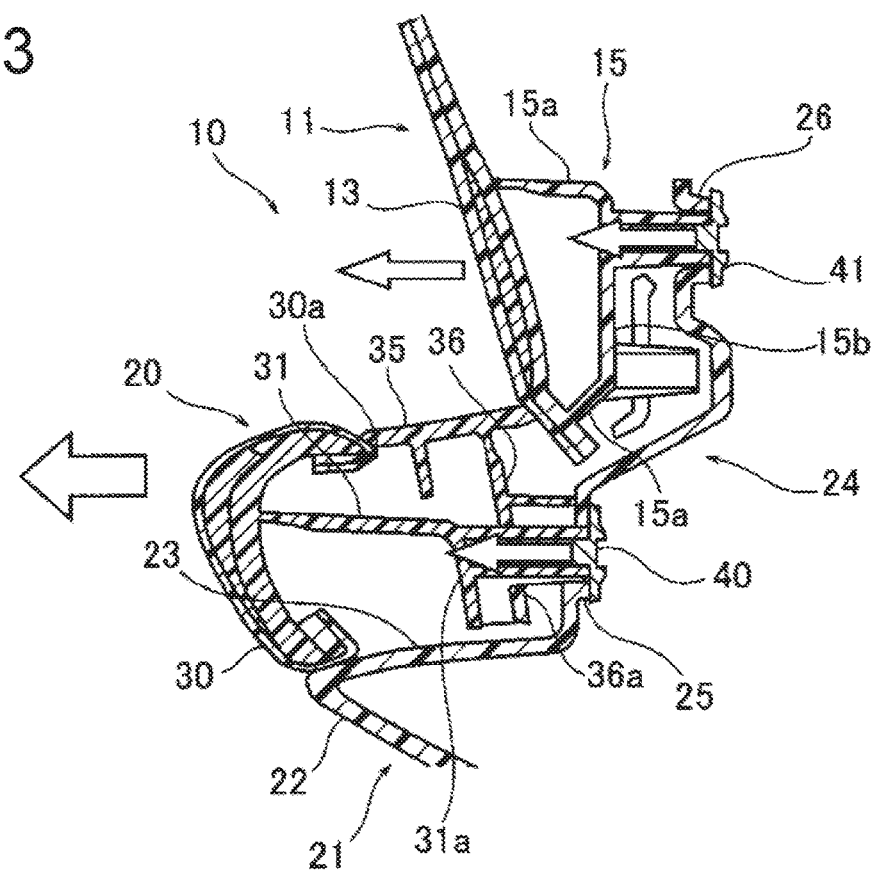
FIG. 3 is an explanatory view illustrating a state in which a load is applied to a door armrest.

FIG. 3 is an explanatory view illustrating a state in which a load is applied to the door armrest 20. When the armrest upper section 30 is pulled toward the cabin side with one's hand laid thereon, the first fixing part 25 is pulled via the armrest fixing piece 31. As the panel fixing piece 36 is also fixed to the first fixing part 25, the switch panel 35 moves toward the cabin side along with the armrest upper section 30.

As the bracket portion 24 has an integrated structure including the first fixing part 25 and the second fixing part 26, when the first fixing part 25 is pulled toward the cabin side, the second fixing part 26 is also pulled in the same direction. When the second fixing part 26 is pulled toward the cabin side, the center trim 13 is pushed out toward the cabin side via the trim fastening portion 15, so that the lower end part of the center trim 13 moves toward the cabin side as well. Thus, as the switch panel 35 and the center trim 13 are pulled toward the cabin side along with each other, a gap between the switch panel 35 and the center trim 13 is unlikely to occur.

Figure 4:
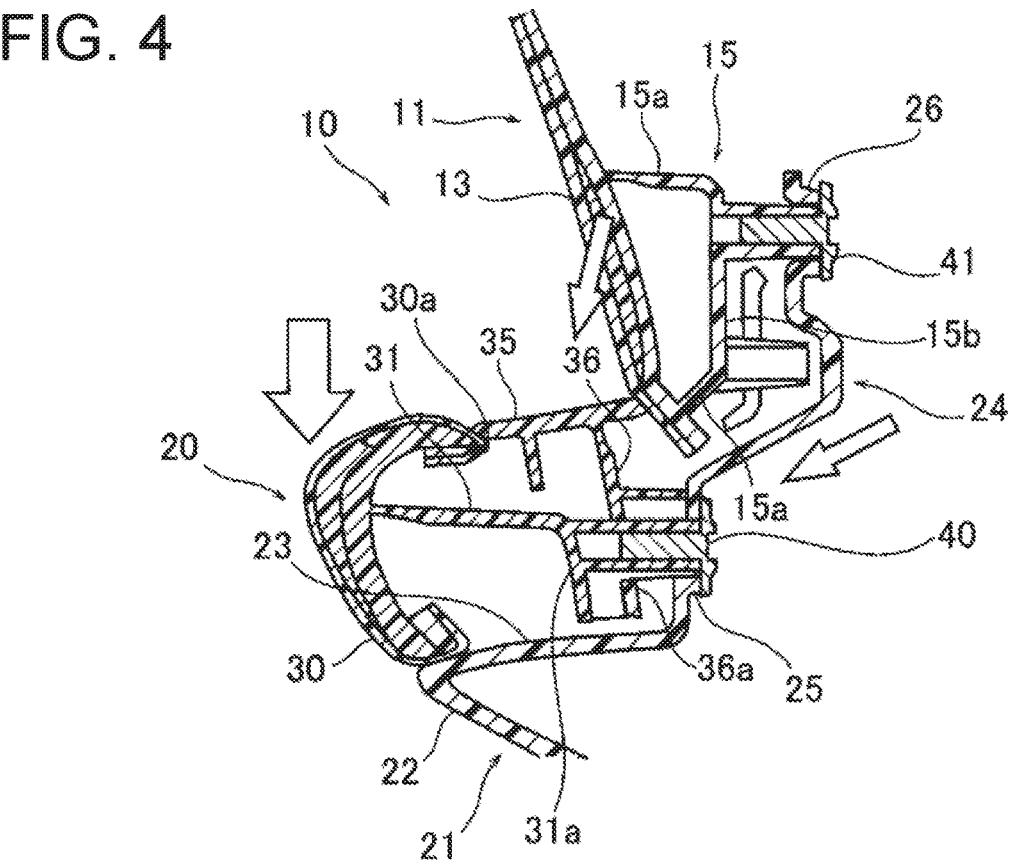
FIG. 4 is an explanatory view illustrating another state in which a load is applied to the door armrest.

FIG. 4 is an explanatory view illustrating another state in which a load is applied to the door armrest 20. When the armrest upper section 30 receives a load from the upper side, the shelf portion 23 of the armrest lower section 21 also receives a load from the upper side via the armrest upper section 30. The load applied to the shelf portion 23 is transmitted to the bracket portion 24 as well.

As described above, the bracket portion 24 has the integrated structure including the first fixing part 25 and the second fixing part 26. The second fixing part 26 is fixed to the center trim 13. Accordingly, a plurality of members including the center trim 13, the trim fastening portion 15, and the second fixing part 26 moves together, and structural stiffness thereof is improved. Consequently, the armrest lower section 21 resists the applied load, so that the door armrest 20 is unlikely to be depressed downward.

The door trim 10 of the present embodiment serves as a vehicular door trim attached on the cabin side of the door inner panel 2. The door trim 10 includes the trim main body 11 including the center trim 13 and a lower trim 14 connected to a lower part thereof, the armrest lower section 21 integrally arranged at an upper part of the lower trim 14, and the armrest upper section 30 located on the armrest lower section 21.

The armrest lower section 21 includes the bulging portion 22 that bulges toward the cabin side, the shelf portion 23 that is formed continuously from the bulging portion 22 and on which the armrest upper section 30 is located, and the bracket portion 24 that extends upward from the side edge of the shelf portion 23 to the back face side of the center trim 13. The bracket portion 24 includes the first fixing part 25 to which the armrest upper section 30 is fixed, and the second fixing part 26 to which the center trim 13 is fixed.

According to the above configuration, as the bracket portion 24 is fixed to the center trim 13, the plurality of members moves together and structural stiffness thereof is improved. Consequently, the armrest lower section 21 resists the applied load, so that the door armrest 20 is unlikely to be depressed downward. Thus, the door trim 10 having excellent unity with the door armrest 20 is provided.

As the trim main body 11 is separated into upper and lower sections, the armrest lower section 21 located above the lower trim 14 tends to have low stiffness In the present embodiment, as the bracket portion 24 is extended and fixed to the center trim 13, the bracket portion 24 and the center trim 13 are integrated. Accordingly, stiffness of the door armrest 20 can be improved.

In the present embodiment, the door trim 10 further includes the switch panel 35 attached to the panel opening 30a arranged at the upper face of the armrest upper section 30. The switch panel 35 is fixed to the first fixing part 25.

According to the above configuration, as the center trim 13 and the switch panel 35 moves together with respect to a load, a gap between the switch panel 35 and the center trim 13 is unlikely to occur. Thus, the door trim 10 having excellent unity with the door armrest 20 can be provided.

As the trim main body 11 is separated into upper and lower sections, the upper section of the armrest lower section 21 tends to be easily moved. However, in the present embodiment, as the center trim 13 and the switch panel 35 moves together, a gap between the center trim 13 and the switch panel 35 is unlikely to occur.

In the present embodiment, the center trim 13 includes the base 15b arranged via the legs rising on the back face side of the center trim 13. The center trim 13 is fixed to the second fixing part 26 via the base 15b.

Forming the base 15b into a tower shape as described above improves surface stiffness of the center trim 13. Accordingly, stiffness of the armrest lower section 21 improves as well.

In the present embodiment, both the armrest upper section 30 and the switch panel 35 are fixed to the first fixing part 25, respectively. However, only either thereof may be fixed to the first fixing part 25.

In the above, description is provided on the vehicular door trim of the present embodiment. However, not limited thereto, the present invention can be modified within the scope of the present invention.

REFERENCE SIGNS LIST

1: Side door
2: Door inner panel
10: Door trim
11: Trim main body
12: Upper trim
13: Center trim (First trim)
14: Lower trim (Second trim)
15: Trim fastening portion
15a: Leg
15b: Base
20: Door armrest
21: Armrest lower section
22: Bulging portion
23: Shelf portion
24: Bracket portion
25: First fixing part
26: Second fixing part
30: Armrest upper section
30a: Panel opening (Opening portion)
31: Armrest fixing piece
35: Switch panel
36: Panel fixing piece
37: Pull-handle

The invention claimed is:

1. A vehicular door trim attached to a vehicle body panel on a cabin side, the vehicular door trim comprising:
   a trim main body including a first trim and a second trim attached below the first trim;
   an armrest lower section integrally formed with an upper part of the second trim; and
   an armrest upper section located on the armrest lower section,
   wherein the armrest lower section includes,
      a bulging portion bulging toward the cabin side,
      a shelf portion arranged continuously from the bulging portion and on which the armrest upper section is placed, and
      a bracket portion extending upward from a side edge of the shelf portion to a back face side of the first trim, the bracket portion including,
         a first fixing part to which the armrest upper section is fixed, and
         a second fixing part to which the first trim is fixed.

2. The vehicular door trim according to claim 1, further comprising:
   a switch panel attached to an opening portion formed at an upper face of the armrest upper section,
   wherein the switch panel is fixed to the first fixing part.

3. The vehicular door trim according to claim 2,
wherein the first trim includes a base arranged via a plurality of legs rising on a back face side at a lower end part of the first trim, and
the first trim is fixed to the second fixing part via the base.

4. A vehicular door trim attached to a vehicle body panel on a cabin side, the vehicular door trim comprising:
a trim main body including a first trim and a second trim attached below the first trim;
an armrest lower section integrally formed with an upper part of the second trim;
an armrest upper section located on the armrest lower section; and
a switch panel attached to an opening portion formed at an upper face of the armrest upper section,
wherein the armrest lower section includes,
a bulging portion bulging toward the cabin side,
a shelf portion arranged continuously from the bulging portion and on which the armrest upper section is placed, and
a bracket portion extending upward from a side edge of the shelf portion to a back face side of the first trim, the bracket portion including,
a first fixing part to which the switch panel is fixed, and
a second fixing part to which the first trim is fixed.

* * * * *